United States Patent [19]
Winski

[11] Patent Number: 5,746,572
[45] Date of Patent: May 5, 1998

[54] CONVEYING APPARATUS AND METHODS OF USE

[75] Inventor: Ernest P. Winski, Oshkosh, Wis.

[73] Assignee: Goldco Industries, Inc., Loveland, Colo.

[21] Appl. No.: 214,432

[22] Filed: Mar. 18, 1994

Related U.S. Application Data

[63] Continuation-in-part of Ser. No. 672,314, Mar. 20, 1991, Pat. No. 5,299,691, which is a continuation-in-part of Ser. No. 449,235, Dec. 6, 1989, Pat. No. 5,256,028, which is a continuation of Ser. No. 102,386, Sep. 29, 1987, abandoned, which is a continuation-in-part of Ser. No. 888,511, Jul. 23, 1986, abandoned.

[51] Int. Cl.$^6$ ..................................................... B65G 59/02
[52] U.S. Cl. ........................ 414/796.3; 198/419.2; 198/454; 198/461.3; 414/786; 414/796.8
[58] Field of Search ................. 198/419.2, 454, 198/461.2, 461.3; 414/796.3, 796.8

[56] References Cited

U.S. PATENT DOCUMENTS

| | | | |
|---|---|---|---|
| 4,054,199 | 10/1977 | Polderman | 198/452 |
| 4,669,604 | 6/1987 | Lenhart | 198/452 |
| 5,018,940 | 5/1991 | Hognestad et al. | 414/796.8 |
| 5,170,879 | 12/1992 | Smith | 198/452 |
| 5,269,646 | 12/1993 | Focke | 414/796.3 |

FOREIGN PATENT DOCUMENTS

| | | | |
|---|---|---|---|
| 3444776 | 6/1986 | Germany | 414/796.8 |

*Primary Examiner*—Janice L. Krizek
*Attorney, Agent, or Firm*—Robert E. Harris

[57] ABSTRACT

This invention pertains to removing a row or layer of material from a supporting surface, with the row or layer advancing on a removal conveyor in a line abreast, and converting the row or layer into a line, advancing single file. Apparatus and methods are disclosed. Each unit of material is moved in turn, longitudinally out of its line abreast, and into sole occupation of a discrete length of the converting conveyor assembly. The units so moved longitudinally are moved, as necessary, transversely across the accelerating conveyor and into an alignment zone, and are then assembled into a line advancing single file.

74 Claims, 3 Drawing Sheets

FIG. 1

CONVEYING APPARATUS AND METHODS OF USE

This application is a Continuation-in-Part of application Ser. No. 07/672,314, filed Mar. 20, 1991, now U.S. Pat. No. 5,299,691, which is a Continuation-in-Part of application Ser. No. 07/449,235, filed Dec. 6, 1989, now U.S. Pat. No. 5,256,028; which is a Continuation of Ser. No. 07/102,386, filed Sep. 29, 1987, abandoned; which is a Continuation-in-Part of Ser. No. 06/888,511 filed Jul. 23, 1986, abandoned, all of the above being herein incorporated by reference.

BACKGROUND OF THE INVENTION

This invention relates to handling material on pallets. It relates especially to palletized units of material, and to depalletizing those units in layers, converting the depalletized layers, and delivering the corresponding units of material in a line, advancing single file, one behind the other. The invention relates specifically to apparatus and methods for depalletizing pallet loads, e.g. a layer at a time, and forming corresponding units of material into a line, advancing single file.

Apparatus and methods are known (e.g. my U.S. Pat. No. 4,704,060) for receiving units of material travelling single file on a conveyor, for assembling the units of material into a layer, and for placing the layers on a pallet. Apparatus and methods are also known (e.g. my U.S. Pat. No. 4,988,264) for depalletizing layers of material, separating each layer into its respective rows, a given row travelling in a first direction, then changing the direction of advance of the row to a second direction, perpendicular to the first direction, and thereby advancing the units of material single file.

However, there is no teaching of apparatus or methods for converting a row of units which are advancing abreast, directly to a line advancing single file in the same direction, without placing the units on a conveyor advancing in a second/different direction.

It is an object of the invention to provide a method for removing a row or layer of material from a pallet, placing the row or layer on a conveyor system advancing rows or layers in a given direction, and separating the layer or row into individual units while continuing to advance the units in the given direction.

It is another object to provide a method for separating units of material, advancing abreast in a row on a conveyor, from the row, by accelerating each unit to a position ahead of all units not yet accelerated from the row.

It is still another object to provide a method of separating the units by accelerating the units in a sequence taken transversely across the width of the row abreast.

It is yet another object to provide a method of separating the units by accelerating the units such that each unit accelerated gains sole occupation of a discrete portion of the length of the conveyor.

It is a further object to provide a method of separating the units by transferring each unit in the row onto an accelerating conveyor at a different time.

It is another object to provide a method of separating the units by accelerating each unit at a different time, the accelerating being achieved by transferring the units across a diagonal joint between a first conveyor and an accelerating conveyor.

It is a still further object to provide a method of separating the units by driving a removal conveyor at a first speed, driving the accelerating conveyor, in a second drive zone, at a second drive speed, faster than the first drive speed, and driving the accelerating conveyor, in a third drive zone disposed transversely across the accelerating conveyor from the second drive zone, at a third drive speed, faster than the second drive speed.

Another object is to provide a depalletizing system having a converting conveyor comprising an acceleration zone where individual units are separated from each other while maintaining a constant direction of travel.

Another object is to provide a depalletizing system having a joint extending, in combination, longitudinally and transversely between a first conveyor and an accelerating conveyor downstream from the first conveyor.

It is still another object to provide a depalletizing system having such a joint extending across the converting conveyor assembly at an angle of 0.5–89 degrees with respect to a longitudinal axis extending along the length of the converting conveyor assembly.

SUMMARY OF THE INVENTION

Some of the objects are obtained in novel methods of removing a row or group of units of material from a supporting surface, and converting the row. The method comprises removing the row from the supporting surface and depositing the row onto a special conveyor system. The special conveyor system has a length dimension, and comprises a converting conveyor assembly. The converting conveyor assembly has a transverse dimension, and comprises a removal conveyor having a path for advancing the units of material along the length of the conveyor system, and an accelerating conveyor. The converting conveyor assembly comprises a receiving zone on the removal conveyor, and an acceleration zone including at least a portion of the accelerating conveyor. The depositing of the row onto the conveyor system comprises depositing the row onto the removal conveyor, in the receiving zone, with the row of units of material arrayed in a line abreast of the path along which the removal conveyor advances the units. The method further comprises advancing the row along the path of the removal conveyor, at a first speed, with the units travelling abreast in the row, and subsequently transferring the row into the acceleration zone, and accelerating the rate of advance of each of the units of material in the acceleration zone, along the length of the converting conveyor assembly, from the row or group, to a second speed faster than the first speed, such that each of the units, when so accelerated, advances from the row and gains sole occupation of a discrete portion of the length of the conveyor system.

Typically, each row is separated from any other rows prior to accelerating the rate of advance of the individual units of material in the acceleration zone.

Also, typically, each unit of material, when so accelerated in the acceleration zone, is accelerated in a direction corresponding to the path for advancing the units of material, while maintaining its position across the transverse dimension of the conveyor system.

As the units of material are accelerated, it is preferred that each unit of material so accelerated, in turn advances to a position ahead of all of the units of material which have not, to that time, been so accelerated.

Where the row has a first unit of material closest to a first side of the converting conveyor assembly, and a last unit of material closest to a second opposite side of the converting conveyor assembly, with the remainder of the units arrayed transversely across the transverse dimension of the converting conveyor assembly in sequence between the first and last units, the method preferably includes accelerating the units in a sequence taken transversely across the converting conveyor assembly, in the acceleration zone, beginning with the first unit and ending with the last unit.

Preferably, as each unit of material is accelerated, the respective unit gains sole occupation of the respective discrete portion of the length of the conveyor system before the next unit is accelerated from the row.

Preferably, the method includes accelerating each unit of material along the converting conveyor assembly by transferring each unit in the row to the accelerating conveyor at a time different from the time any other unit is transferred.

Preferably, the converting conveyor assembly is set up such that the removal conveyor has a discharge end abutting an entrance end of the accelerating conveyor, the discharge end, and the entrance end, of the removal conveyor and the accelerating conveyor respectively, in combination, comprising a joint between the removal conveyor and the accelerating conveyor, extending both longitudinally and transversely across the width of the converting conveyor assembly. In this embodiment, the method includes, after the depositing of the row onto the removal conveyor, with the row having a first unit closest to a first side of the converting conveyor assembly, a last unit closest to a second opposite side of the converting conveyor assembly, and the remainder of the units arrayed transversely across the converting conveyor assembly, between the first and last units of material, transferring the units of material across the joint, to the accelerating conveyor in a sequence taken transversely across the converting conveyor assembly, beginning with the first unit of material and ending with the last unit of material.

Preferably, the process comprises converting the row, traveling abreast, into a line advancing single file along the length of the conveyor system, by selecting an alignment zone, between opposing sides of the converting conveyor assembly, the alignment zone comprising a portion less than all of the transverse dimension of, and extending along the length of, the converting conveyor assembly, for aligning of the units of material in the alignment zone, and urging the units of material which have been accelerated, and which are not already aligned with the alignment zone, to move in a direction transverse to the length of the conveyor system, and into alignment with each other in the alignment zone.

In some embodiments, urging the units of material into the alignment zone comprises impinging accelerated units of material, carried by the converting conveyor assembly, against an upright conveyor disposed transverse to the length of the conveyor system, the upright conveyor being disposed to engage upright sides of the units of material, and to thereby urge those units not in the alignment zone, to move into the alignment zone.

The method is readily adapted to remove and convert the units of material a layer at a time, wherein a layer comprises at least two rows, and at least one of the rows comprises at least two units of material. The method comprises the steps of moving the layer from the supporting surface to the removal conveyor which is travelling at a first speed, transferring the layer from the removal conveyor to a speed-up conveyor, between the removal conveyor and the accelerating conveyor, thus to separate the layer into its individual rows, separated longitudinally along the length of the converting conveyor assembly, each row advancing with its individual units of material arrayed abreast. Each row is then treated separately, in the acceleration zone, to separate each row into its individual component units.

The invention also contemplates apparatus, as a depalletizing system, comprising a depalletizer, for removing a layer of units of material from a pallet, and a conveyor system, for receiving the layer of units of material removed from the pallet, the conveyor system having a length, and a path of travel, and comprising a converting conveyor assembly, for receiving the layer, and for converting a row of the units of material, advancing abreast, along the path of travel, into a line advancing single file. The converting conveyor assembly comprises (i) a removal conveyor, for receiving the layer of units of material from the depalletizer, and for transporting the units of material in rows, each such row advancing abreast along the converting conveyor assembly, in a first drive zone, at a first speed, and (ii) an accelerating conveyor for accelerating the speed of travel of units of material along the path of travel of the conveyor system, whereby each unit of material is accelerated into sole occupation of a discrete portion of the length of the conveyor system. The converting conveyor assembly has, in sequence, (iii) a receiving zone, on the removal conveyor, for receiving the units of material from the depalletizer, (iv) an acceleration zone, including at least a portion of the accelerating conveyor, where the individual units of material, from a row, are separated from each other along the longitudinal length of the converting conveyor assembly, and (v) an alignment zone, and (vi) shunt apparatus mounted transverse to the path of travel, where the individual units of material are urged to move transversely across the converting conveyor assembly, on the accelerating conveyor, and into a line advancing single file along the length of the conveyor system.

In one embodiment, the accelerating conveyor has a second drive zone for driving units of material at a second drive speed, and a third drive zone, disposed transversely across the accelerating conveyor from the second drive zone, for driving units of material at a third drive speed, faster than the second drive speed, whereby a first unit of material is driven, in the second drive zone, at the second drive speed, and a second unit of material, disposed transversely across the accelerating conveyor from the first unit of material, is driven, in the third drive zone, at the third drive speed, thereby separating the first unit from the second unit, along the length of the conveyor system.

In another embodiment, the acceleration zone comprises a joint between the removal conveyor and the accelerating conveyor, extending both longitudinally and transversely across the width of the converting conveyor assembly, whereby, when a row of units of material traversing the converting conveyor assembly has a first unit of material closest to a first side of the converting conveyor assembly, a last unit of material on a second opposite side of the converting conveyor assembly, and the remainder of the units arrayed transversely across the converting conveyor assembly between the first and last units of material, the conveyor system transfers the units across the joint, to the accelerating conveyor in a sequence taken transversely across the converting conveyor assembly, beginning with the first unit of material and ending with the last unit of material, such that each unit of material gains sole occupation of a discrete portion of the length of the conveyor system, in the acceleration zone, and the shunt apparatus shunts each such unit of material, as necessary, transversely across the accelerating conveyor to form a line, advancing single file, off said accelerating conveyor, and thence out of the converting conveyor assembly.

Preferably, the shunt apparatus comprises an upright conveyor disposed to engage upright sides of the units of material, thereby to urge the units which are not in the alignment zone, to move into the alignment zone.

For converting a layer which contains a plurality of rows which advance e.g. along the removal conveyor, one behind the other, the depalletizing system preferably includes a speed-up conveyor between the removal conveyor and the accelerating conveyor, wherein the removal conveyor advances each row of the units of material at a first speed, the speed-up conveyor advances the row at a second speed faster than the first speed, and the accelerating conveyor advances individual units, from a given row, at a third speed faster than the second speed, the converting conveyor assembly thus comprising a speed-up zone, including at least part of the speed-up conveyor, between the receiving zone and the acceleration zone.

DETAILED DESCRIPTION OF THE ILLUSTRATED EMBODIMENTS

A depalletizer 10 embodying the invention is illustrated in the drawings. The depalletizer 10 is usable for removing a layer of material, such as cases 12 of product from a pallet or other supporting surface, such as a spacing sheet, or a previously deposited stack of material.

The depalletizer 10 comprises a frame 14 including four generally vertical posts 18 defining the corners of a rectangle. The depalletizer 10 also comprises a generally rectangular, horizontally disposed carriage 22 having opposite first and second or right and left ends and four corners respectively connected to the four posts 18 of the frame 14 for vertical movement relative thereto. In the illustrated construction, the carriage 22 includes first and second generally parallel, horizontal, spaced apart side members 26, connected by connecting supports 30.

Figure 1:
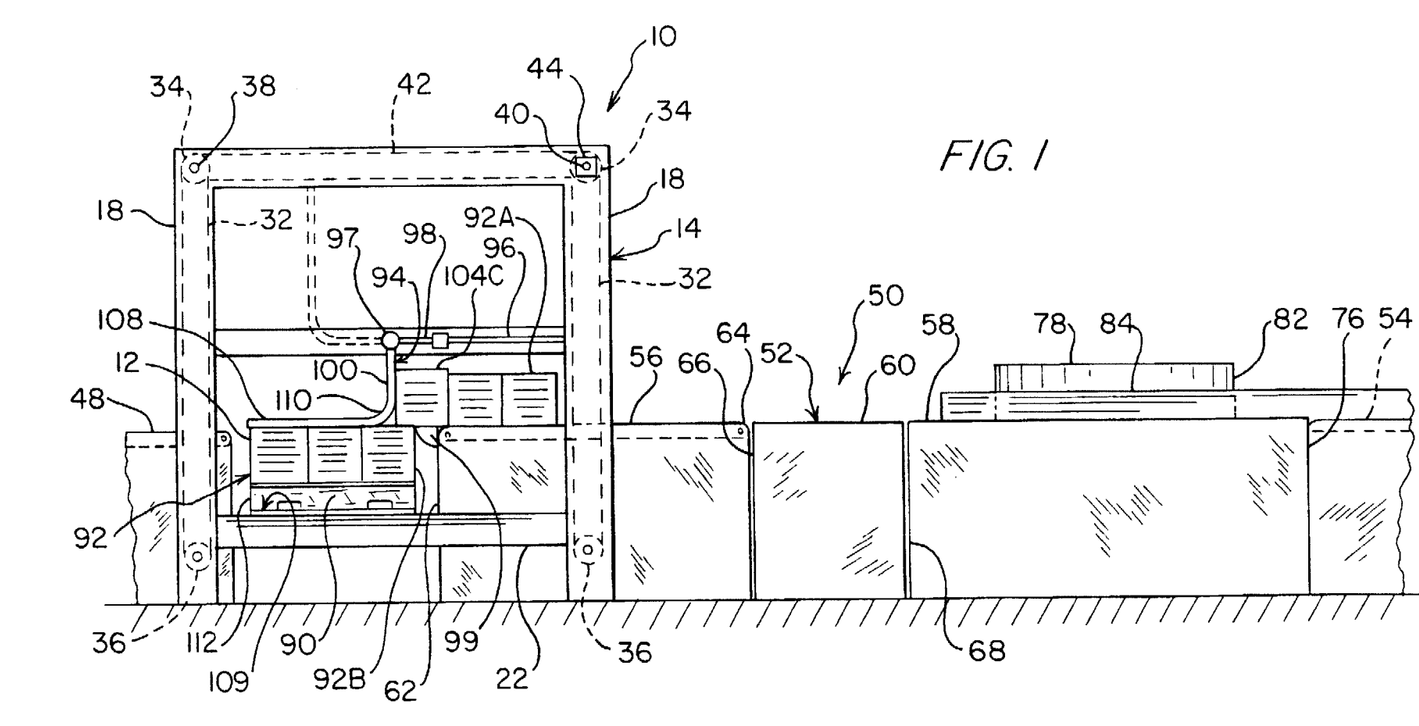
FIG. 1 shows a side elevation of a depalletizing system of this invention.

The depalletizer 10 also comprises means for reciprocally, vertically moving the carriage 22 relative to the frame 14. In the preferred embodiment, the means for moving the carriage 22 includes an endless chain 32 connected to each of the respective corners of the carriage 22. As best illustrated in FIG. 1, each post 18 includes an upper drive sprocket 34 and a lower idler sprocket 36. Endless chain 32 is mounted around the sprockets 34 and 36. The upper sprockets 34 of the two left posts 18 (as viewed in FIG. 2) are connected by a horizontal drive shaft 38 (FIG. 1) and the upper sprockets 34 of the two right posts 18 (as viewed in FIG. 2) are connected by a horizontal drive shaft 40 (FIG. 1). Also the upper sprockets 34 of the two right posts 18 (as viewed in FIG. 2) are connected by an endless drive chain 42 to the upper sprockets 34 of the left posts 18 (as viewed in FIG. 2). Drive chain 42 is shown in FIG. 1. Drive motor 44 is connected to the drive shaft 40 to drive the two right chains 32, and via the endless chain 42 and the drive shaft 38, the two left chains 32. Accordingly, the four endless chains 32 move in common, thereby causing common vertical movement of the four corners of the carriage 22.

The depalletizer 10 comprises a generally horizontal pallet conveyor 46, mounted on the carriage 22, for receiving and supporting a pallet load of material to be depalletized. Conveyor 46 is e.g. a pair of endless chains, disposed in a common horizontal plane, and driven at a common speed, in the same direction.

In-feed conveyor 48 is positioned adjacent the left side of the depalletizer (as seen in the drawings), for feeding loads of units of material 12 to the depalletizer, typically on pallets.

A conveyor system 50 is positioned at the right side of the depalletizer (as seen in FIG. 1), and receives the units of material from the depalletizer (as layers or rows), for conversion into individual units of material. The conveyor system 50 comprises generally a converting conveyor assembly 52 and an exit conveyor 54. Exit conveyor 54 is typically a conventional conveyor, such as a roller conveyor, either powered or un-powered.

Figure 2:
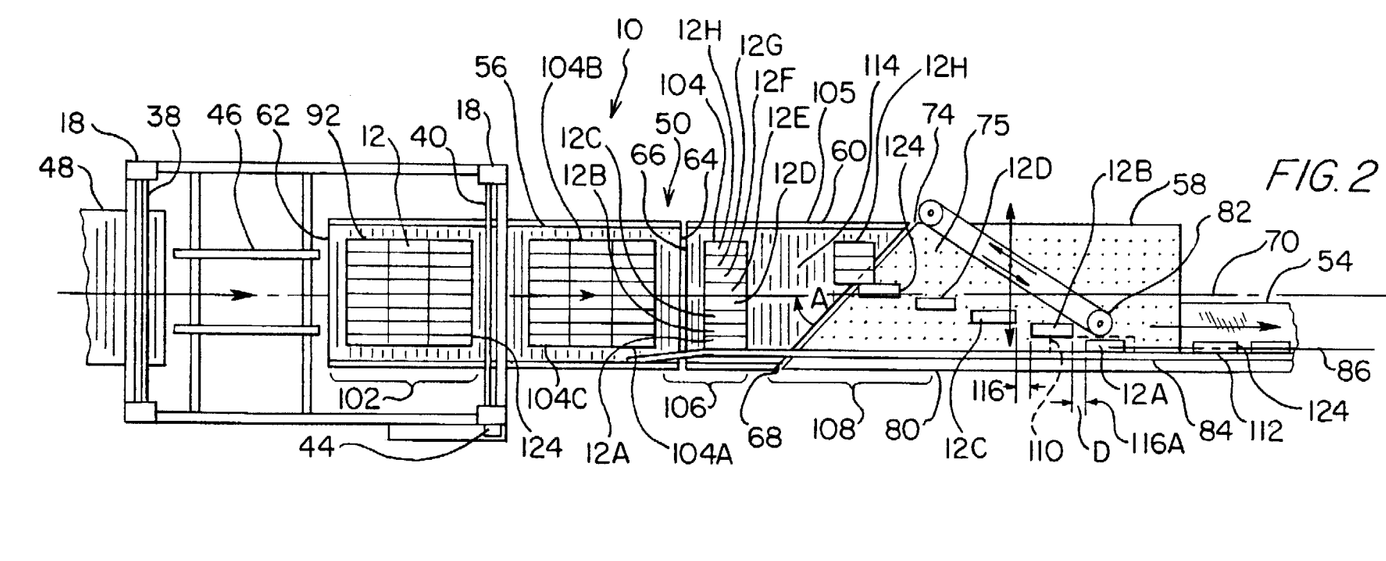
FIG. 2 shows a top view of the depalletizing system of FIG. 1, including various stages in its operation.
Figure 3:
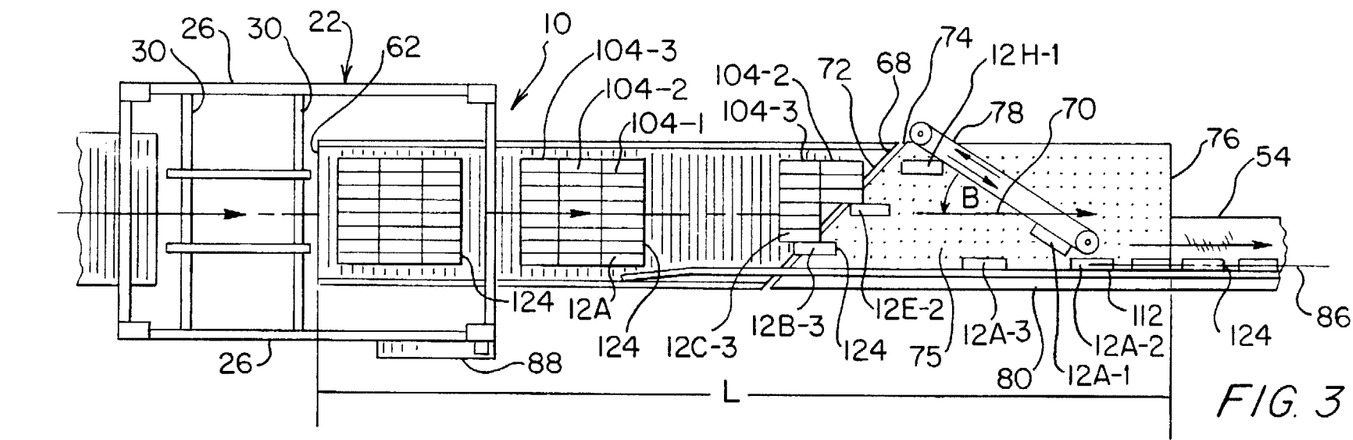
FIG. 3 shows a top view of a depalletizing system of the invention, without the speed-up conveyor.
Figure 4:
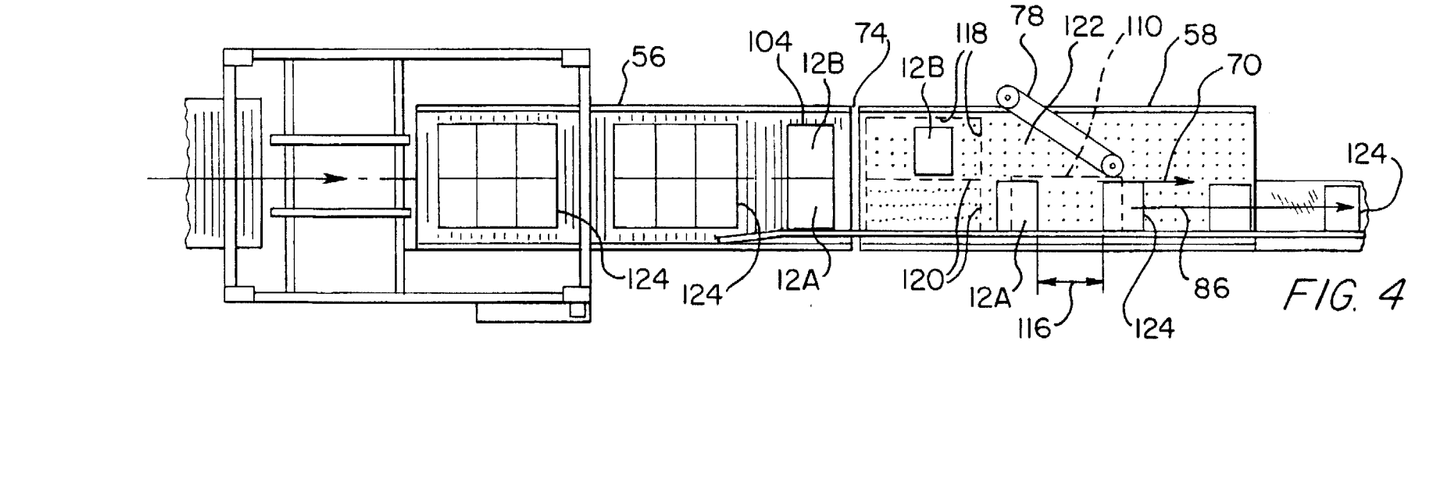
FIG. 4 shows a top view of an alternate embodiment of the depalletizing systems of the invention, wherein multiple drive speed zones on the accelerating conveyor provide longitudinal separation between units of a given row.

Referring now to FIG. 2, the converting conveyor assembly 52 generally comprises a removal conveyor 56, an accelerating conveyor 58, and optionally a speed-up conveyor 60. A pair of arrows in FIGS. 2–4 shows the general path of travel of units of material along the length of the converting conveyor assembly. A third arrow on exit conveyor 54 shows the direction of travel of units of material on exit conveyor 54.

Removal conveyor 56 is powered, having for example small, individually powered roller wheels, driven by a motive driver, not shown. The function of the removal conveyor 56 is to receive individual rows, groups or layers of units of material from the depalletizer 10, at its entrance end 62, to advance the respective row or layer away from the depalletizer along the converting conveyor assembly. At its exit end 64, the removal conveyor is abutted against the entrance end 66 of the speed-up conveyor 60.

Like the removal conveyor 56, the speed-up conveyor 60 is powered, having for example small, individually powered roller wheels. Such a drive system is commonly referred to as a Shuttleworth® conveyor.

The exit end 68 of the speed-up conveyor 60 is configured at an angle "A" that extends both longitudinally and transversely across the speed-up conveyor. As shown, the angle "A" is disposed about 45° from the longitudinal axis 70 of the converting conveyor assembly.

The exit end 68 of the speed-up conveyor 60 abuts a correspondingly angled entrance end 72 of the accelerating conveyor 58. Accordingly, the joint 74 between the exit end 68 of the speed-up conveyor 60 and the entrance end 72 of the accelerating conveyor 58 extends longitudinally and transversely across the width of the converting conveyor assembly at the angle "A."

Accelerating conveyor 58 is powered as a jet stream conveyor, having a multiplicity of directed jets 75 of air, the jets having both vertical and horizontal vectors, for moving the units of material from the entrance end 72, toward the exit end 76 of the accelerating conveyor 58.

A vertical conveyor 78 (e.g. a driven belt conveyor) is disposed, at an angle "B," transversely across and along the length of accelerating conveyor 58. Vertical conveyor 78 is driven in the direction shown, urging the units of material to move transversely across the accelerating conveyor, toward the near side 80 of the converting conveyor assembly as they move longitudinally along the length of the accelerating conveyor. The discharge end 82 of the vertical conveyor 78 is positioned to urge a unit of material 12 against a guide rail 84 adjacent the near side 80 of the converting conveyor assembly, such that the combination of the vertical conveyor 78 and the guide rail 84 positions the units of material along the discharge path 86 (which corresponds with a portion of the transverse dimension of the accelerating conveyor) and in line with the exit conveyor 54. As indicated by the double headed arrow in FIG. 2, the vertical conveyor 78 can be adjusted transversely, with respect to accelerating conveyor 58, to position its discharge end 82 such that the discharge path 86 defined between the vertical conveyor and the guide rail 84 properly aligns the units of material for discharge onto the exit conveyor 54.

The depalletizing system, including the in-feed conveyor, and the converting conveyor assembly, is controlled by a conventional (e.g. electronic) controller 88.

The converting conveyor assembly 52, including the removal conveyor 56, the speed-up conveyor 60, and the accelerating conveyor 58, has four special zones wherein specific functions are carried out. First, the converting conveyor assembly 52 has a receiving zone 102, on the removal conveyor, where rows 104 and/or layers 92 are received from the depalletizer 10.

Second, the converting conveyor assembly 52 has a speed-up zone 106, including at least part of speed-up conveyor 60, where each successive row 104 is separated from the rows behind it.

Third, the converting conveyor assembly 52 has an acceleration zone 108, including at least part of the accelerating conveyor, where the individual units of material 12 advancing abreast within a given row, or series of proximate rows, are separated from each other along the length of the accelerating conveyor. Beyond the acceleration zone, the so separated units of material are re-assembled into a line 112, advancing single file, out of the converting conveyor assembly and onto the exit conveyor 54.

Fourth, the converting conveyor assembly has an alignment zone 110 where the units 12 which have been separated in the acceleration zone, are realigned, into a line which advances single file, out of the converting conveyor assembly. The alignment zone generally comprises a portion of the width of the accelerating conveyor, along a portion of the length of the accelerating conveyor, outlined in dashed lines in FIG. 2 between guide rail 84 and end 82 of vertical conveyor 78. Vertical conveyor 78 brings all of the units which are not aligned with the alignment zone into alignment with each other in the alignment zone, and correspondingly into alignment with the exit conveyor, along path 86. In the embodiments shown, the units 12A are in alignment with the alignment zone 110 without being acted upon by the vertical conveyor 78, because their direction of travel, from joint 74, along accelerating conveyor 58, by virtue of the driving force of accelerating conveyor 58, inherently moves the units 12A into alignment with the rest of the units 12 which are entering the alignment zone 110. Thus, the units 12A need not be, and are not, acted on by the vertical conveyor 78. Thus, only those units 12 which are not aligned with the exit conveyor (or other exit mechanism) are acted on by the vertical conveyor.

The receiving zone 102 is typically confined within the bounds of the removal conveyor 56, to that length of the conveyor which initially receives the layer from the depalletizer. The receiving zone 102 thus may comprise less than all of the length of the removal conveyor, as in FIG. 1.

The removal conveyor 56, and thus the receiving zone 102, can include a leading apron, not shown, onto which a layer 92 is initially deposited by the depalletizer 10. The respective layer 92 is then pushed onto a driven belt or other advancing apparatus on the removal conveyor 56 by a push arm, also not shown. To the extent the speed at which the layer is pushed onto the belt is slower than the speed of advance on the belt, transfer of the layer onto the belt effects separation of the rows 104 from each other.

The speed-up zone 106 begins at the entrance end 66 of the speed-up conveyor, and encompasses that portion of the length of the speed-up conveyor which is driven faster than the removal conveyor, which is typically the entire length of the speed-up conveyor.

The acceleration zone 108 is typically confined to the area near the entrance end 72 of the accelerating conveyor, where the initial spacing of the units 12 from each other, along the length of the accelerating conveyor, occurs.

Each of the zones 102, 106, 108, and 110 are illustrated as lying along a given length of the converting conveyor assembly. Their longitudinal position along the length of the converting conveyor assembly does, however, vary according to variations in the function of the conveyors across the transverse dimension of the converting conveyor assembly. Thus, the acceleration zone 108 lies across the conveyors 58, 60 at an angle "A" that generally follows joint 74.

After passing through the acceleration zone, the so-accelerated units of material impinge against the upright conveyor 78, engaging the upright sides of the units against the conveyor 78, and thence urging and moving the units in a transverse direction across the accelerating conveyor and into the alignment zone 110. The units of material are thus aligned and assembled, by the combined effect of the vertical conveyor 78 and the drive imparted by accelerating conveyor 58, into the above recited line 112 advancing single file toward the exit conveyor 54.

A depalletizing operation is performed as follows. A loaded pallet 90, having one or more layers 92 approaches the depalletizer on in-feed conveyor 48. Carriage 22 adjusts the height of the pallet conveyor 46 such that it is horizontally in line with in-feed conveyor 48. In-feed conveyor 48 then drives the pallet toward and onto the pallet conveyor. Pallet conveyor 46 is correspondingly driven in the same direction, such that the loaded pallet is transferred from the in-feed conveyor to the pallet conveyor.

The height of carriage 22 is then adjusted as necessary (e.g. in response to a signal from an electric eye) so that the bottom surface of the top layer 92A is positioned slightly higher than the top of removal conveyor 56. Sweep arm 94 is then lowered from its raised position. Ram 96 then powers sweep arm 94, through piston 98, pushing the layer 92A off the pallet load, as seen in FIG. 1. A retainer ramp 99 assists in filling any gap between the pallet load and the removal conveyor 56. Ramp 99 preferably abuts the next underlying layer 92B, thus stabilizing layer 92B while overlying layer 92A is being pushed off the load. After the top layer 92A is pushed off, the carriage raises the pallet load to present the bottom of the next layer 92B at a height where it can be subsequently pushed off the pallet and onto the removal conveyor.

Sweep arm 94 is secured to piston 98 at the head 97 of the sweep arm. When sweep arm 94 is disposed in its lowered position as shown in FIG. 1, layer pushing plate 100 extends downwardly from head 97. Front arcuate segment 110 extends downwardly and rearwardly, in an arc, from layer pushing plate 100. Flap suppression plate 108 extends rearwardly from the bottom of front arcuate segment 110.

Sweep arm 94 is typically disposed in the raised position when a load is being moved into the unloading station 109. The sweep arm 94, with ram piston 98 fully extended, is lowered to its layer-pushing position once the load has been positioned at the unloading station. The layer pushing plate, when so lowered, is disposed behind rear edge 112 of the pallet, thus behind the rear edge of the corresponding rear row 104C of the top layer 92A, and between in-feed conveyor 48 and rear edge 112 of the pallet 90.

Returning now to FIG. 1, as piston 98 is retracted toward the ram 96, with the sweep arm 94 lowered, the sweep arm 94 engages upstanding the surfaces of the rear row 104C of the top layer 92A. Layer pushing plate 100 thus engages the rear upstanding surfaces, and exerts a pushing force against, the rear upstanding surfaces, of rear row 104C of layer 92A, thus pushing layer 92A forwardly off the load, and toward removal conveyor 56. As sweep arm 94, and accordingly layer 92A, move toward removal conveyor 56, arcuate segment 110, and subsequently flap suppression plate 108, engage the top flaps of the units 12 of underlying layer 92B.

Figure 5A:
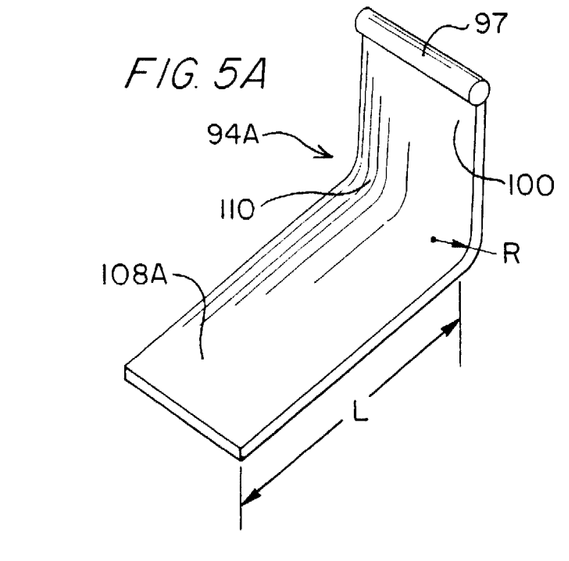
FIGS. 5A, 5B and 5C show embodiments of sweep arms.

As suggested in FIG. 5A, layer pushing plate 100, arcuate segment 110, and flap suppression plate 108 extend across the entire width of the load. Length "L" of flap suppression plate 108 is sufficiently long to simultaneously suppress the flaps on all of the rows 104 of the underlying layer 92B.

Arcuate segment 110, and suppression plate 108 thus prevent loose or otherwise open flaps on units in the underlying layer from extending upwardly, and being inadvertently caught by, layer pushing plate 100. By so disabling the potential for flaps on underlying units to catch on the sweep arm, arcuate segment 110 and suppression plate 108 avoid the potential for the sweep arm 94 to inadvertently push a unit 12 off the load in the wrong direction, or to crush or otherwise damage a unit.

When sweep arm 94 has completed pushing a layer (e.g. layer 92A) off the load, as is nearing completion in FIG. 1, sweep arm 94 may be raised, as shown in dashed outline in FIG. 1.

In the alternative, and preferred, sweep arm 94 remains in the lowered position, and moves rearwardly toward in-feed conveyor 48 until layer pushing plate 100 is again positioned to the rear of rear edge 112 of the pallet, and thus to the rear of underlying layer 92B. Carriage 22 then raises the load until the underlying layer 92B is high enough to be pushed off the load and onto removal conveyor 56. Sweep arm 94 then moves forward, pushing layer 92B off the load.

This process of moving the sweep arm forward to remove a layer, and rearward to provide clearance for raising the next layer into position for removal, is repeated as necessary until all desired layers have been removed from the load. Then the sweep arm is raised, to provide clearance for feeding the next load from in-feed conveyor 48 onto layer unloading station 109. The next load is then fed from in-feed conveyor 48 into the layer unloading station 109. Meantime, the ram has extended piston 98, moving sweep arm 94 rearwardly, so that the sweep arm is positioned to the rear of where the newly-arrived load will be positioned. Once the newly-arrived load is in position for unloading in the layer unloading station, sweep arm 94 is lowered, behind the load, and the unloading steps are repeated, pushing the layers off the load.

The function of flap suppression plate 108 is to hold down any unsecured or otherwise open flaps on the units 12 in the underlying layer 92B, so that sweep arm 94 can move to the rear of pallet 90 while still lowered, after pushing off a layer 92A, without inadvertently engaging a raised flap and thereby knocking or pushing a unit 12 off the load in the wrong direction. Flap suppression plate 108, as in FIGS. 1 and 5A, is especially useful when handling product in unsealed cases.

Figure 5B:
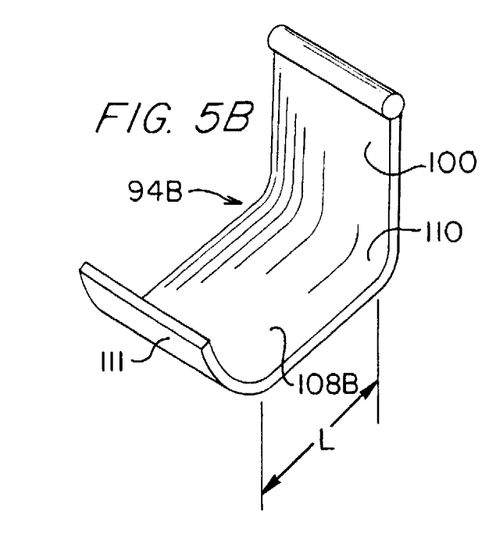
Figure 5C:
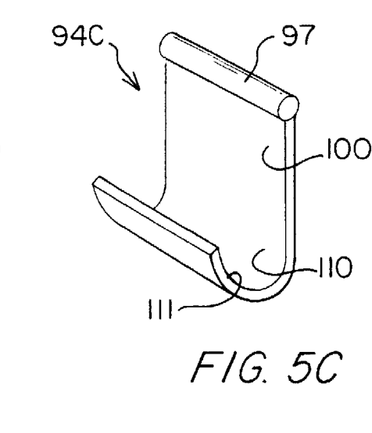

FIG. 5A shows, pictorially, the sweep arm 94 illustrated in FIG. 1, wherein arcuate segment 110 and flap suppression plate 108, in combination, simultaneously suppress all flaps in underlying layer 94B. FIGS. 5B, 5C show alternate embodiments 94B, 94C respectively of the sweep arm. In the embodiment of FIG. 5B, the flap suppression plate 108B, while maintained at full width, so that it suppresses flaps along the full width of the load (full length of a row 104), has been shortened such that, by the time the sweep arm 94B has pushed the layer 92A entirely off the load, flap suppression plate 108B has passed over, temporarily suppressed, and subsequently released, at least some flaps on at least the last row of the underlying layer 92B. Thus, one or more flaps may rise from units 12 in the underlying layer 92B when sweep arm 94B moves past, and releases them.

As sweep arm 94B (still lowered) moves rearwardly, back over all the rows of underlying layer 92B, rear arcuate segment 111 initiates suppression of any raised flaps by again urging the raised flaps downward, so that sweep arm 94B can pass rearwardly over them without engaging a flap in its rearward movement and thus pushing a unit off the load in a wrong direction (e.g. rearwardly).

In the embodiment of FIG. 5C, flap suppression plate 108 has been eliminated, whereby front and rear arcuate segments 110 and 111 represent a continuous arc, with rear arcuate segment 111 extending rearwardly and upwardly from the bottom of front arcuate segment 110.

When sweep arm 94C moves forward, to push a layer off the load, front arcuate segment 110 engages and suppresses flaps on units 12 in underlying layer 92B. When sweep arm 94C moves back toward in-feed conveyor 48, after pushing off layer 92A, rear arcuate segment 111 engages and suppresses any up-lifted flaps on underlying units 12 as sweep arm 94C moves over and past them.

Of the three embodiments of the sweep arm 94 shown in FIGS. 5A–5C, the embodiment of FIG. 5A is usually preferred for its versatility in handling a greater variety of loads.

When layer 92A overlies layer 92B, overlying units 12 hold down any loose flaps on the units 12 of underlying layer 92B. As overlying layer 92A is pushed off, overlying units 12 release the flaps on the underlying units 12. Arcuate segment 110 has a sufficiently small radius "R" that it engages the flaps, and suppresses them, before they are fully released by the units 12 of the overlying layer 92A.

Thus, the flaps are never able to rise between the time they are released by the overlying units and the time they are engaged by front arcuate segment 110. As front arcuate segment 110 moves past the respective flaps, flap suppression plate 108 engages the flaps. Referring to the embodiment of FIG. 5A, once flap suppression plate 108A engages a given flap on the underlying layer 92B, it continues to suppress that flap during the rest of the forward movement of the sweep arm in pushing the layer 92A off the load, and during rearward movement of the sweep arm until the leading edge of the flap suppression plate, at the bottom of front arcuate segment 110, has passed clear of the respective flap. Once the flap suppression plate has passed clear (rearwardly) of the flap, there is no further risk of inadvertently engaging the flap with the sweep arm, and pushing it off the load in the wrong direction. Thus, using the embodiment of FIG. 5A, the underlying flaps never have opportunity to arise until after the sweep arm 94 has again moved to the rear of the load, whereby effective suppression of the flaps in the underlying layer is maintained, and thus virtually assured, for almost any application.

By contrast, in the embodiments of FIGS. 5B and 5C, at least some flaps are typically released from suppression while the sweep arm 94 is moving forward to push the overlying layer off the load. Such flaps can thus arise when the sweep arm 94 moves forward past them. The arisen flaps are again suppressed, first by the rear arcuate segment 111, when sweep arm 94 moves back over them during its rearward movement. Thus, sweep arms 94B and 94C, preferred for their smaller size and weight, are selected where the underlying flaps tend predictably to arise only in small increments of height, e.g. less than 1–2 inches above the general top surface of the layer 92B; and wherein the so-arisen flaps can again be effectively suppressed by the rearward movement of rear arcuate segment 111.

Returning now to the layer unloading operation, layer 92A is received on the removal conveyor 56, at the receiving zone 102. From the receiving zone, layer 92A is driven, at a first speed, along removal conveyor 56 toward speed-up conveyor 60. In the meantime, the second layer 92B is removed from the pallet, and the empty pallet is removed from the pallet conveyor 46; so that the pallet conveyor is prepared to receive the next pallet load of material.

Speed-up conveyor 60 is driven at a second speed, faster than the first speed (of the removal conveyor). Thus, when the first row 104A on layer 92A arrives at the speed-up conveyor, and is transferred to the speed-up conveyor, it speeds up to the faster speed of the speed-up conveyor. Meantime, the remainder of the rows (104B and 104C) are travelling at the first (slower) speed of the removal conveyor. Until such time as the second row 104B is transferred to the speed-up conveyor, the first row 104A travels faster than the second row 104B. During that time interval, the faster moving first row 104A pulls away from (separates from) the second row 104B, such that a space 114 separates the rows 104A and 104B. The ultimate dimensions of space 114 are controlled by the relative speeds at which the two respective conveyors advance the rows 104. Rows 104B and 104C are similarly separated by a space 114 when row 104B is transferred to speed-up conveyor 60.

As each row 104 approaches the exit end 68 of the speed-up conveyor 60, the unit 12A closest to the near side 80 of the converting conveyor assembly reaches the accelerating conveyor first, because of the acute angle "A" described by the joint 74 between the speed-up conveyor and the accelerating conveyor. As the row 104 continues to advance along the removal conveyor 56, the last unit 12H is disposed closest to the opposite (far) side 105, with the remainder of the units 12B, 12C, 12D, etc., arrayed transversely across the transverse dimension of the conveyor in sequence between the first and last units, 12A and 12H. Thus, each unit reaches the joint 74 in turn, at a separate time, distinct from the times when each of the other units 12 in that row are transferred to the accelerating conveyor. Thus, the units in a given row are accelerated in a sequence taken transversely across the conveyor, beginning with the first unit 12A and ending with the last unit 12H.

Accelerating conveyor 58 is driven at a third speed, faster than the second speed of the speed-up conveyor. Accordingly, as each unit of material 12 is transferred to the accelerating conveyor, it accelerates, moving along the length of the converting conveyor assembly at the faster (third) speed of the accelerating conveyor. Meantime, the remainder of the units (12B, 12C, 12D, etc.) are travelling at the second (slower) speed of the speed-up conveyor. Until such time as the second unit 12B is transferred to the accelerating conveyor, the first unit 12A travels faster than the second unit 12B. During that time interval, the faster moving first unit 12A pulls away from (separates from) the remainder of the units in the row, such that a space 116 separates the unit 12A from the remainder of the units (12B, 12C, 12C, etc.) in the row.

When unit 12B reaches the joint 74, and is transferred to the accelerating conveyor, it, too, speeds up and advances to a position ahead of all the units which have not, to that time, been so accelerated. Meantime, unit 12B has accelerated to the speed of unit 12A, whereby the distance between units 12A and 12B is then constant. The ultimate longitudinal dimension "D" of space 116A, between unit 12A, and its next trailing unit 12B, is controlled by the relative speeds at which the two respective conveyors (speed-up conveyor 60 and accelerating conveyor 58) advance the units 12.

As illustrated in the drawings, the relative speeds of the conveyors (referring now to the removal conveyor, the speed-up conveyor, and the accelerating conveyor) should be such that each unit 12, when accelerated on the accelerating conveyor, advances from the row and gains sole occupation of a discrete portion of the length "L" of the converting conveyor assembly on the accelerating conveyor, and thus of the conveyor system. Since the longitudinal dimension of space 116 between unit 12A, and the next trailing unit, 12B, is established when unit 12B is transferred to the accelerating conveyor, and reaches the speed of the accelerating conveyor, the leading unit 12A should gain sole occupation of its discrete portion of the length of the conveyor before the next unit 12B is accelerated from the row. Corresponding timing applies to each combination of leading and next trailing units (e.g. unit 12D should establish its discrete portion of the length of the conveyor before unit 12E is accelerated from the row).

Referring to FIG. 2, the speed of the accelerating conveyor 58, relative to the speed of the speed-up conveyor 60 and the angle "A," must be at least fast enough for each unit 12 to advance completely out of the row, and establish the positive space 116 between the units remaining in the row, before the next unit 12 is released from the respective row 104, as shown in FIG. 2. Thus the minimum speed of accelerating conveyor 58 is a function of the speed of speed-up conveyor 60, and the angle "A."

A typical set of parameters for the embodiment of FIG. 2 is:

| | |
|---|---|
| Units in a row (as illustrated) | 8 |
| No. rows simultaneously feeding into accelerating conveyor | 1 |
| Joint angle "A" | 45° |
| Length of each unit | 12 inches |
| Width of each unit | 4.5 inches |
| Speed of removal conveyor | 15 feet per minute (fpm) |
| Speed of speed-up conveyor | 50 fpm |
| Speed of accelerating conveyor | 150 fpm |
| Space between leading edges of consecutive units | 13.5 inches |
| Space between trailing edge of one unit and leading edge of next unit. | '1.5 inch |

In the embodiment shown in FIG. 2, speed-up conveyor 60 operates on a layer 92, to separate the rows from each other, while the accelerating conveyor 58 operates on the separated rows, separating the individual units 12 in a given row, from each other.

FIG. 3 shows a more complex arrangement at the accelerating conveyor 58. In this embodiment, the speed-up conveyor has been deleted. Thus, the layers 92 arrive at the accelerating conveyor with the rows (104-1, 104-2, and 104-3) abutted against each other, with no separation between the rows. As seen in FIG. 3, and especially when using smaller angles "A," the accelerating conveyor 58 can be receiving units 12 from all three of the illustrated rows at the same time. In FIG. 3, the numbering on the units 12 indicates both its position in the row and the row from which the unit was accelerated. Thus unit 12C-2 was accelerated from position "C" in the second row.

The speed differential, in the FIG. 3 embodiment, must satisfy two mass balance criteria. First, it must separate the units of a given row from each other. This requires that the speed of the accelerating conveyor be a multiple of the speed of the removal conveyor, with the multiple being at least as great as the number of units in a row. Thus, with eight units in a row, the speed of the accelerating conveyor must be at least eight times as great as the speed of the removal conveyor which delivers the layers to the joint.

Second, where the rows are not separated, or not sufficiently separated from each other, the speed of the accelerating conveyor must be fast enough to separate the units released by one row from the units released by the other rows which are simultaneously releasing units across joint 74. Accordingly, the speed of the accelerating conveyor must be a multiple of the speed of the removal conveyor, with the multiple being at least as great as the number of units in those rows, combined, which can simultaneously release units to the accelerating conveyor. Thus, where three rows can release units to the accelerating conveyor at the same time, as in the embodiment of FIG. 3, with each row containing eight units, the speed of the accelerating conveyor must be at least 24 times the speed of the removal conveyor.

A typical set of parameters for the embodiment of FIG. 3 is:

| | |
|---|---|
| Units in a row | 8 |
| No. rows simultaneously feeding into accelerating conveyor | 3 |
| Joint angle "A" | 45° |
| Length of each unit | 12 inches |
| Width of each unit | 4.5 inches |
| Speed of removal conveyor | 5 feet per minute (fpm) |
| Speed of speed-up conveyor | NA |
| Speed of accelerating conveyor | 150 fpm |
| Space between leading edges of consecutive units | 15 inches |
| Space between trailing edge of one unit and leading edge of next unit. | 3 inches |

Angle "A" can be any angle greater than 0° and less than 90°. However, at extremely small angles the joint 74 is very long, and at extremely large angles the speed ratio between the conveyors that form the joint 74 is very large. Accordingly, the angle "A" is limited to angles of 0.5° to 89°. Preferably, angle "A" is between 20° and 80°, most preferably between 30° and 65°.

FIG. 4 illustrates another method of separating, along the length of the accelerating conveyor, the units from a given row. The converting conveyor assembly shown in FIG. 4 includes a removal conveyor 56 and an accelerating conveyor 58, but not a speed-up conveyor 60. A speed-up conveyor 60 could be used if desired. For ease of illustration, FIG. 4 shows a row having two units, which are separated on the accelerating conveyor.

In the FIG. 4 embodiment, the joint 74 extends across the converting conveyor assembly, between the conveyors which form the joint at an angle "A" of 90 degrees to the longitudinal axis 70. Noting that the removal conveyor comprises a first drive zone (not pointed out) driving the rows at a first drive speed, the accelerating conveyor 58 has a second drive zone 118, extending along the length of the accelerating conveyor, and across about one half the width of the conveyor, in an area between the joint 74 and vertical conveyor 78, for driving units 12 thereon at a second speed. A third drive zone 120 extends along the other half of the width of the conveyor, also in an area between the joint 74 and vertical conveyor 78, for driving units thereon 12 at a third speed faster than the second speed. The balance of the accelerating conveyor, not included within the second or third drive zones, comprises a fourth drive zone 122 wherein the units are driven at a fourth speed.

Referring now to FIG. 4, when a row 104, comprising the two units 12A and 12B shown, reaches joint 74, both units 12A and 12B cross the joint 74, thus enter accelerating conveyor 58, at the same time. Both units 12A and 12B attain the respective speeds of the respective drive zones they enter. Since the third drive zone 120 moves the unit 12A faster than the second drive zone 118 moves the unit 12B, unit 12A advances faster within its third drive zone 120 than unit 12B advances within its second drive zone 118. Accordingly, unit 12A moves ahead of unit 12B. But all the units travel at the same speed in the fourth drive zone 122. Thus, whatever space 116 is established between the units 12A and 12B by the speed differentials in the second and third drive zones 118, 120 is maintained by the units as they traverse the fourth drive zone 122.

As seen herein, the invention provides a method for removing a row or layer of material from a pallet or other supporting surface, placing the row or layer on a conveyor system advancing rows or layers in a given direction, and separating the layer or row into individual units while continuing to advance the units in the given direction.

As the layer 92 or row 104 is placed on removal conveyor 56, and begins to advance along converting conveyor assembly 46, each unit 12 has a leading side 124 which is leading (is at the front of) the unit. The leading side 124 continues to lead the respective unit 12 throughout its traverse of the converting conveyor assembly 46, at least until the unit passes into the alignment zone 110, where the unit becomes part of the reassembled configuration of "units in a line, advancing single file."

In some cases, it may be desirable to rotate some or all of the units 12, without changing their direction of advance (e.g. along axis 70), to present a second, different side of the unit 12 as the leading side 124. Within such an operating environment, prior to rotation, the leading side 124 as referred to here and in the claims, is the first "side," which leads the respective unit prior to rotation; while after rotation, the leading side 124 is the second side, which leads the unit after rotation. Thus, the statement that the leading side 124 continues to lead the unit through its traverse of the converting conveyor assembly includes those embodiments wherein the unit is rotated to present a second (or third, etc.) side to lead the unit in the same one direction in which it was advancing before the rotation.

The invention also provides a method for separating units of material, advancing abreast in a row on a conveyor, from the row, by accelerating each unit to a position ahead of all units not yet accelerated from the row.

The invention further provides a method of separating the units by accelerating the units in a sequence taken transversely across the width of the row abreast.

The invention provides that each unit, as accelerated, gains sole occupation of a discrete portion of the length of the accelerating conveyor.

Each unit in the row is preferably transferred onto the accelerating conveyor at a different time, preferably by accelerating each unit at a different time, by transferring the units across a diagonal joint between a first conveyor (either the removal conveyor 58 or a speed-up conveyor 60) and the accelerating conveyor.

In an alternative embodiment, the invention provides a method of separating the units by driving the removal conveyor at a first speed, driving a second drive zone on the accelerating conveyor at a second speed faster than the first speed, and driving a third drive zone, disposed transversely across the accelerating conveyor from the second zone, at a third speed, faster than the second speed.

The invention also provides depalletizing apparatus having a converting conveyor comprising an acceleration zone where individual units are separated from each other while maintaining a constant direction of travel.

The invention further provides depalletizing apparatus having a joint extending, in combination, longitudinally and transversely between a first conveyor and an accelerating conveyor, downstream from the first conveyor.

Finally, the invention provides depalletizing apparatus having such a joint extending across the converting conveyor assembly at an angle of 0.5–89 degrees with respect to a longitudinal axis extending along the length "L" of the converting conveyor assembly.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A method of removing a group of units of material from a supporting surface, and converting said group, said method comprising the steps of:
   (a) removing said group from said supporting surface and depositing said group onto a conveyor system, said conveyor system having a length dimension, and comprising a converting conveyor assembly, said converting conveyor assembly having a transverse dimension, and comprising a removal conveyor having a path for advancing said units of material along said length, and an accelerating conveyor, said converting conveyor assembly comprising a receiving zone on said removal conveyor, and an acceleration zone including at least a portion of said accelerating conveyor, said depositing of said group onto said conveyor system comprising depositing said group on said removal conveyor, in said receiving zone;
   (b) advancing said group of units of material along said path of said removal conveyor, in a first drive zone, in a first direction, at a first speed, with said units of material travelling in said group; and
   (c) transferring said group into said acceleration zone, and accelerating the rate of advance of each of said units of material, in said acceleration zone, in said first direction, from said group, such that each of said units of material, when so accelerated, advances from said group to said accelerating conveyor at a different time from the time any other said unit of material is transferred, and gains sole occupation of a discrete portion of said length of said conveyor system.

2. A method as in claim 1, and including the step of forming said units of material, which have been so accelerated, into a line advancing single file along said length of said conveyor system, by selecting an alignment zone, disposed between first and second opposing sides of said converting conveyor assembly, and comprising a portion less than all of said transverse dimension of, and extending along the length of, said converting conveyor assembly, for aligning of said units of material in said alignment zone, and urging ones of said units of material which have been so accelerated, and which are not already aligned with said alignment zone, to move in a direction transverse to said length of said conveyor system, and into alignment with each other in said selected alignment zone.

3. A method as in claim 2, and including impinging ones of said units of material so accelerated, and so carried by said converting conveyor assembly, against an upright conveyor disposed transverse to said length of said conveyor system, said upright conveyor being disposed to engage upright sides of the units of material, and to thereby urge said units of material, not in said alignment zone, to move into said alignment zone.

4. A method as in claim 1 wherein, as each said unit of material is accelerated, said unit gains sole occupation of the respective said discrete portion of said length of said conveyor system before the next said unit of material is accelerated from said row.

5. A method as in claim 1, said removal conveyor having a discharge end abutting an entrance end of said accelerating conveyor, said discharge end, and said entrance end, of said removal conveyor and said accelerating conveyor respectively, in combination, comprising a joint between said removal conveyor and said accelerating conveyor, extending both longitudinally along and transversely across said converting conveyor assembly, and after said depositing of said row onto said removal conveyor, with said row having a first unit of material closest to a first side of said converting conveyor assembly, a last unit of material closest to a second opposite side of said converting conveyor assembly, and the remainder of the units of material arrayed transversely across said converting conveyor assembly, between said first and last units of material, transferring said units of material across said joint, to said accelerating conveyor in a sequence taken transversely across said converting conveyor assembly, beginning with the first unit of material and ending with the last unit of material, whereby each such unit of material gains sole occupation of the discrete portion of said length of said conveyor system.

6. A method as in claim 1 and including, prior to accelerating said units of material in said, the step of separating said group from any other group travelling on said converting conveyor assembly.

7. A method as in claim 1, each said unit of material having a leading side leading said unit of material as said unit of material begins said advancing along said removal conveyor, and wherein said leading side continues to lead said unit of material until said unit of material gains sole occupation of said discrete portion of said length of said conveyor system.

8. A method of removing a group of units of material from a supporting surface, with said units traveling in said group, and converting said group, said method comprising the steps of:
   (a) removing said group from said supporting surface and depositing said group onto a conveyor system, said conveyor system having a length dimension, and comprising a converting conveyor assembly, said converting conveyor assembly having a transverse dimension, and comprising a removal conveyor having a path for advancing said units of material along said length, and an accelerating conveyor, said converting conveyor assembly comprising a receiving zone on said removal conveyor, and an acceleration zone including at least a portion of said accelerating conveyor, said depositing of said group onto said conveyor system comprising depositing said group on said removal conveyor, in said receiving zone;

(b) advancing said group of units of material along said path of said removal conveyor, in a first direction, at a first speed, with said units of material travelling in said group; and (c) transferring said group into said acceleration zone, and accelerating the rate of advance of each of said units of material, in said acceleration zone, in said first direction, from said group, such that each said unit of material, when so accelerated, advances from said group and gains sole occupation of a discrete portion of said length of said conveyor system, while maintaining its position across the transverse dimension of said conveyor system.

9. A method as in claim 8, and including the step of forming said units of material, which have been so accelerated, into a line advancing single file along said length of said conveyor system, by selecting an alignment zone, disposed between first and second opposing sides of said converting conveyor assembly, and comprising a portion less than all of said transverse dimension of, and extending along the length of, said converting conveyor assembly, for aligning of said units of material in said alignment zone, and urging ones of said units of material which have been so accelerated, and which are not already aligned with said alignment zone, to move in a direction transverse to said length of said conveyor system, and into alignment with each other in said selected alignment zone.

10. A method as in claim 9 and including impinging ones of said units of material so accelerated, and so carried by said converting conveyor assembly, against an upright conveyor disposed transverse to said length of said conveyor system, said upright conveyor being disposed to engage upright sides of the units of material, and to thereby urge said units of material, not in said alignment zone, to move into said alignment zone.

11. A method as in claim 8, said removal conveyor having a discharge end abutting an entrance end of said accelerating conveyor, said discharge end, and said entrance end, of said removal conveyor and said accelerating conveyor respectively, in combination, comprising a joint between said removal conveyor and said accelerating conveyor, extending both longitudinally along and transversely across said converting conveyor assembly, and after said depositing of said group onto said removal conveyor, with said group having a first unit of material closest to a first side of said converting conveyor assembly, a last unit of material closest to a second opposite side of said converting conveyor assembly, and the remainder of the units of material arrayed transversely across said converting conveyor assembly, between said first and last units of material, transferring said units of material across said joint, to said accelerating conveyor in a sequence taken transversely across said converting conveyor assembly, beginning with the first unit of material and ending with the last unit of material, whereby each such unit of material gains sole occupation of the discrete portion of said length of said conveyor system.

12. A method as in claim 8 wherein each unit of material so accelerated advances to a position ahead of all of said units of material which have not, to that time, been so accelerated.

13. A method as in claim 8, said group having a first unit of material closest to a first side of said converting conveyor assembly, and a last unit of material closest to a second opposite side of said converting conveyor assembly, with the remainder of said units of material being arrayed across said transverse dimension of said converting conveyor assembly in sequence between said first and said last units of material, said method including accelerating said units of material in a sequence taken transversely across said converting conveyor assembly, in said acceleration zone, beginning with said first unit of material and ending with said last unit of material.

14. A method as in claim 8 wherein, as each said unit of material is accelerated, the respective said unit gains sole occupation of the respective said discrete portion of said length of said conveyor system before the next said unit of material is accelerated from said group.

15. A method as in claim 8 and including accelerating the rate of advance of each of said units of material along said conveyor system by transferring each of said units of material, in said group, to said accelerating conveyor at a time different from the time when any other said unit of material is transferred.

16. A method as in claim 8 and including, prior to accelerating the respective said units of material in said group, the step of separating said group from any other group travelling in said converting conveyor assembly.

17. A method as in claim 8 wherein said accelerating of each of said units of material comprises driving a first unit of material at a second speed, in a second drive zone, on said accelerating conveyor, and driving a second unit of material at a third speed faster than said second speed, in a third drive zone disposed transversely across said accelerating conveyor from said second drive zone.

18. A method as in claim 8, each said unit of material having a leading side leading said unit of material as said unit of material begins said advancing along said removal conveyor, and wherein said leading side continues to lead said unit of material until said unit of material gains sole occupation of said discrete portion of said length of said conveyor system.

19. An apparatus, comprising:
(a) an unloading station for removing units of material from a supporting surface; and
(b) a conveyor system, for receiving the units of material removed from the supporting surface, said conveyor system having a length, and a path of travel, and comprising a converting conveyor assembly, for receiving the units, and for converting a group of the units of material into a line advancing single file, said converting conveyor assembly comprising
(i) a removal conveyor, for receiving the units of material from said unloading station, and for driving the units of material in groups, each such group advancing along said converting conveyor assembly in a first drive zone, at a first drive speed, and
(ii) an accelerating conveyor, for accelerating the speed of travel of units of material along the path of travel of said conveyor system, whereby each unit of material is accelerated into sole occupation of a discrete portion of the length of said conveyor system while maintaining its position across the transverse dimension of said conveyor system.

20. An apparatus as in claim 19, said converting conveyor assembly being adapted to convert one or more groups of units of material, advancing on said removal conveyor, each unit of material having a leading side leading the unit of material as the unit of material begins advancing along said removal conveyor, into a line advancing single file, with the leading side continuing to lead the unit of material until the unit of material gains sole occupation of the discrete portion of the length of said conveyor system.

21. An apparatus as in claim 20 and including a controller, for controlling said apparatus.

22. An apparatus as in claim 19, for spreading units of material along the length of said accelerating conveyor wherein each such unit so accelerated gains sole occupation of a discrete portion of said length of said conveyor system, said accelerating conveyor having a width, a second drive zone for driving the units of material at a second drive speed, and a third drive zone, disposed transversely across said accelerating conveyor from said second drive zone, for driving the units of material at a third drive speed, faster than the second drive speed, whereby a first the unit of material in said second drive zone is driven at the second drive speed, and a second unit of material, disposed transversely across said accelerating conveyor from the first unit, in said third drive zone, is driven at the faster third drive speed, thereby separating the first unit from the second unit, along the length of said conveyor system.

23. An apparatus as in claim 19 and including a controller, for controlling said apparatus.

24. An apparatus as in claim 19 wherein said converting conveyor assembly has, in sequence, (iii) a receiving zone, on said removal conveyor, for receiving the units of material from said unloading station and advancing the units of material in a first direction, (iv) an acceleration zone, including at least a portion of said accelerating conveyor, wherein the individual units of material are separated from each other while travelling in said first direction, (v) an alignment zone, and (vi) a driven shunt apparatus mounted transverse to the path of travel, for urging individual units of material to move transversely across said accelerating conveyor, and into a line, advancing single file along said length of said conveyor system, from said alignment zone.

25. An apparatus as in claim 24 wherein said shunt apparatus comprises an upright conveyor disposed to engage upright sides of the units of material, and thereby to urge the units of material, not aligned with said alignment zone, to move into said alignment zone.

26. An apparatus as in claim 24 wherein said acceleration zone comprises a joint between said removal conveyor and said accelerating conveyor, extending both longitudinally along the length, and transversely across the width of said converting conveyor assembly, whereby, when a group of units of material traversing said converting conveyor assembly has a first unit of material closest to a first side of said converting conveyor assembly, a last unit of material on a second opposite side of said converting conveyor assembly, and the remainder of the units of material arrayed transversely across said converting conveyor assembly between the first and last units of material, said conveyor system transfers the units of material of the group across said joint, to said accelerating conveyor in a sequence, with respect to the units of the group, taken transversely across said converting conveyor assembly, beginning with the first unit of material and ending with the last unit of material, such that each unit of material gains sole occupation of a discrete portion of said length of said conveyor system, in said acceleration zone, and said shunt apparatus shunts each such unit of material, as necessary, transversely across said accelerating conveyor to form a line in said alignment zone, advancing single file, out of said alignment zone, and thence out of said converting conveyor assembly.

27. An apparatus as in claim 26, said converting conveyor assembly having a longitudinal axis extending along said length, said joint extending across said converting conveyor assembly at an angle of about 0.5 degrees to about 89 degrees, with respect to said longitudinal axis.

28. An apparatus as in claim 26, said converting conveyor assembly having a longitudinal axis extending along said length, said joint extending across said converting conveyor assembly at an angle of about 20 degrees to about 80 degrees, with respect to said longitudinal axis.

29. An apparatus as in claim 26, said converting conveyor assembly having a longitudinal axis extending along said length, said joint extending across said converting conveyor assembly at an angle of about 30 degrees to about 65 degrees, with respect to said longitudinal axis.

30. An apparatus as in claim 26 wherein said shunt apparatus comprises an upright conveyor disposed to engage upright sides of the units of material, and thereby to urge the units of material, not aligned with said alignment zone, to move into said alignment zone.

31. An apparatus as in claim 24, said converting conveyor assembly including a speed-up conveyor disposed between said removal conveyor and said accelerating conveyor, such that the units of material are transferred from said removal conveyor to said speed-up conveyor, and from said speed-up conveyor to said accelerating conveyor, said speed-up conveyor advancing the units of material at a second drive speed faster than said first drive speed, whereby groups disposed adjacent each other on said removal conveyor are separated from each other on said speed-up conveyor, said converting conveyor assembly thus comprising a speed-up zone, including at least part of said speed-up conveyor, between said receiving zone and said acceleration zone.

32. An apparatus as in claim 31 wherein said acceleration zone comprises a joint between said speed-up conveyor and said accelerating conveyor, extending both longitudinally along the length, and transversely across the width, of said converting conveyor assembly, whereby, when a group of units of material traversing said converting conveyor assembly has a first unit of material closest to a first side of said converting conveyor assembly, a last unit of material on a second opposite side of said converting conveyor assembly, and the remainder of the units of material arrayed transversely across said converting conveyor assembly between the first and last units of material, said conveyor system transfers the units of material of the group across said joint, to said accelerating conveyor in a sequence, with respect to the units of the group, taken transversely across said converting conveyor assembly, beginning with the first unit of material and ending with the last unit of material, such that each unit of material gains sole occupation of a discrete portion of said length of said conveyor system, in said acceleration zone, and said shunt apparatus shunts each such unit of material, as necessary, transversely across said accelerating conveyor to form a line in said alignment zone, advancing single file, out of said alignment zone, and thence out of said converting conveyor assembly.

33. An apparatus as in claim 31, said converting conveyor assembly having a longitudinal axis extending along said length, said removal conveyor having a discharge end abutting an entrance end of said accelerating conveyor, said discharge end and said entrance end, of said removal conveyor and said accelerating conveyor respectively, in combination, comprising a joint between said removal conveyor and said accelerating conveyor, said joint extending across said converting conveyor assembly at an angle of about 0.5 degrees to about 89 degrees, with respect to said longitudinal axis.

34. An apparatus as in claim 31, said converting conveyor assembly having a longitudinal axis extending along said length, said removal conveyor having a discharge end abutting an entrance end of said accelerating conveyor, said discharge end and said entrance end, of said removal conveyor and said accelerating conveyor respectively, in combination, comprising a joint between said removal conveyor and said accelerating conveyor, said joint extending across said converting conveyor assembly at an angle of about 20 degrees to about 80 degrees, with respect to said longitudinal axis.

35. An apparatus as in claim 31, said converting conveyor assembly having a longitudinal axis extending along said length, said removal conveyor having a discharge end abutting an entrance end of said accelerating conveyor, said discharge end and said entrance end, of said removal conveyor and said accelerating conveyor respectively, in combination, comprising a joint between said removal conveyor and said accelerating conveyor, said joint extending across said converting conveyor assembly at an angle of about 30 degrees to about 65 degrees, with respect to said longitudinal axis.

36. An apparatus as in claim 31 wherein said shunt apparatus comprises an upright conveyor disposed to engage upright sides of the units of material, and thereby to urge the units of material, not aligned with said alignment zone, to move into said alignment zone.

37. An apparatus, comprising:
 (a) an unloading station for removing units of material from a supporting surface; and
 (b) a conveyor system, for receiving the units of material removed from the supporting surface, said conveyor system having a length, and a path of travel, and comprising a converting conveyor assembly, for receiving the units, and for converting a group of the units of material into a line of units advancing single file, said converting conveyor assembly comprising
  (i) a removal conveyor, for receiving the units of material from said unloading station, and for driving the units of material in groups, each such group advancing along said converting conveyor assembly in a first drive zone, at a first drive speed,
  (ii) an accelerating conveyor, for accelerating the speed of travel of units of material along the path of travel of said conveyor system, whereby each unit of material is accelerated into sole occupation of a discrete portion of the length of said conveyor system, and
  (iii) an alignment zone for alignment of said units of material, wherein said units of material are converted into a line advancing single file, said alignment taking place after the units of material are accelerated into sole occupation of discrete portions of the length of said conveyor system, said alignment zone including (iv) a driven shunt apparatus mounted transverse to the path of travel, for urging said units of material to move transversely and into a line, advancing single file along said length of said conveyor system, from said alignment zone.

38. An apparatus as in claim 37, said converting conveyor assembly having a longitudinal axis extending along said length, said removal conveyor having a discharge end abutting an entrance end of said accelerating conveyor, said discharge end and said entrance end, of said removal conveyor and said accelerating conveyor respectively, in combination, comprising a joint between said removal conveyor and said accelerating conveyor, said joint extending across said converting conveyor assembly at an angle of about 0.5 degrees to about 89 degrees, with respect to said longitudinal axis.

39. An apparatus as in claim 38, said joint extending across said converting conveyor assembly at an angle of about 20 degrees to about 80 degrees, with respect to said longitudinal axis.

40. An apparatus as in claim 38, said joint extending across said converting conveyor assembly at an angle of about 30 degrees to about 65 degrees, with respect to said longitudinal axis.

41. An apparatus as in claim 37 wherein said acceleration zone comprises a joint between said removal conveyor and said accelerating conveyor, extending both longitudinally along the length, and transversely across said converting conveyor assembly, whereby, when a group of units of material traversing said converting conveyor assembly has a first unit of material closest to a first side of said converting conveyor assembly, a last unit of material on a second opposite side of said converting conveyor assembly, and the remainder of the units of material arrayed transversely across said converting conveyor assembly between the first and last units of material, said conveyor system transfers the units of material of the group across said joint, to said accelerating conveyor in a sequence, with respect to the units of the group, taken transversely across said converting conveyor assembly, beginning with the first unit of material and ending with the last unit of material, such that each unit of material gains sole occupation of a discrete portion of said length of said conveyor system, in said acceleration zone.

42. An apparatus as in claim 41, said converting conveyor assembly having a longitudinal axis extending along said length, said joint extending across said converting conveyor assembly at an angle of about 0.5 degrees to about 89 degrees, with respect to said longitudinal axis.

43. An apparatus as in claim 37, wherein said shunt apparatus comprises an upright driven conveyor disposed to engage upright sides of the units of material, and thereby to urge the units of material, to form said line, advancing single file along said length of said conveyor system.

44. An apparatus as in claim 37, for spreading units of material along the length of said accelerating conveyor wherein each such unit so accelerated gains sole occupation of a discrete portion of said length of said conveyor system, said accelerating conveyor having a width, a second drive zone for driving the units of material at a second drive speed, and a third drive zone, disposed transversely across said accelerating conveyor from said second drive zone, for driving the units of material at a third drive speed, faster than the second drive speed, whereby a first unit of material in said second drive zone is driven at the second drive speed, and a second unit of material, disposed transversely across said accelerating conveyor from the first unit, in said third drive zone, is driven at the faster third drive speed, thereby separating the first unit from the second unit, along the length of said conveyor system.

45. An apparatus as in claim 37, said converting conveyor assembly including a speed-up conveyor disposed between said removal conveyor and said accelerating conveyor, such that the units of material are transferred from said removal conveyor to said speed-up conveyor, and from said speed-up conveyor to said accelerating conveyor, said speed-up conveyor advancing the units of material at a second drive speed faster than said first drive speed, whereby groups disposed adjacent each other on said removal conveyor are separated from each other on said speed-up conveyor, said converting conveyor assembly thus comprising a speed-up zone.

46. An apparatus as in claim 37 and including a controller, for controlling said apparatus.

47. An apparatus, comprising:
(a) an unloading station for removing units of material from a supporting surface; and
(b) a conveyor system, for receiving the units of material removed from the supporting surface, said conveyor system having a length, and a path of travel, and comprising a converting conveyor assembly, for receiving the units, and for converting a group of the units of material into a line of units advancing single file, said converting conveyor assembly comprising
(i) a removal conveyor, for receiving the units of material from said unloading station, and for driving the units of material in groups, each such group advancing along said converting conveyor assembly in a first drive zone, at a first drive speed,
(ii) an accelerating conveyor, for accelerating the speed of travel of units of material along the path of travel of said conveyor system, whereby each unit of material is accelerated into sole occupation of a discrete portion of the length of said conveyor system, and
(iii) an alignment zone, at least some of the units of material on said accelerating conveyor already being in alignment with an exit conveyor which forms a line of said units of material, advancing single file along said length of said conveyor system, from said alignment zone, said alignment zone including (iv) a driven shunt apparatus mounted transverse to the path of travel, for urging said units of material which are not aligned with said exit conveyor to move transversely and into a line, advancing single file along said length of said conveyor system, from said alignment zone.

48. An apparatus as in claim 47, for spreading units of material along the length of said accelerating conveyor wherein each such unit so accelerated gains sole occupation of a discrete portion of said length of said conveyor system, said accelerating conveyor having a width, a second drive zone for driving the units of material at a second drive speed, and a third drive zone, disposed transversely across said accelerating conveyor from said second drive zone, for driving the units of material at a third drive speed, faster than the second drive speed, whereby a first unit of material in said second drive zone is driven at the second drive speed, and a second unit of material, disposed transversely across said accelerating conveyor from the first unit, in said third drive zone, is driven at the faster third drive speed, thereby separating the first unit from the second unit, along the length of said conveyor system.

49. An apparatus as in claim 47 wherein said acceleration zone comprises a joint between said removal conveyor and said accelerating conveyor, extending both longitudinally along the length, and transversely across said converting conveyor assembly, whereby, when a group of units of material traversing said converting conveyor assembly has a first unit of material closest to a first side of said converting conveyor assembly, a last unit of material on a second opposite side of said converting conveyor assembly, and the remainder of the units of material arrayed transversely across said converting conveyor assembly between the first and last units of material, said conveyor system transfers the units of material of the group across said joint, to said accelerating conveyor in a sequence, with respect to the units of the group, taken transversely across said converting conveyor assembly, beginning with the first unit of material and ending with the last unit of material, such that each unit of material gains sole occupation of a discrete portion of said length of said conveyor system, in said acceleration zone.

50. An apparatus as in claim 47, said converting conveyor assembly including a speed-up conveyor disposed between said removal conveyor and said accelerating conveyor, such that the units of material are transferred from said removal conveyor to said speed-up conveyor, and from said speed-up conveyor to said accelerating conveyor, said speed-up conveyor advancing the units of material at a second drive speed faster than said first drive speed, whereby groups disposed adjacent each other on said removal conveyor are separated from each other on said speed-up conveyor, said converting conveyor assembly thus comprising a speed-up zone.

51. An apparatus as in claim 47, said converting conveyor assembly having a longitudinal axis extending along said length, said removal conveyor having a discharge end abutting an entrance end of said accelerating conveyor, said discharge end and said entrance end, of said removal conveyor and said accelerating conveyor respectively, in combination, comprising a joint between said removal conveyor and said accelerating conveyor, said joint extending across said converting conveyor assembly at an angle of about 0.5 degrees to about 89 degrees, with respect to said longitudinal axis.

52. An apparatus, comprising:
(a) an unloading station for removing units of material from a supporting surface; and
(b) a conveyor system, for receiving the units of material removed from the supporting surface, said conveyor system having a length, and a path of travel, and comprising a converting conveyor assembly, for receiving the units, and for converting a group of the units of material into a line of units advancing single file, said converting conveyor assembly comprising
(i) a removal conveyor, for receiving the units of material from said unloading station, and for driving the units of material in groups, each such group advancing along said converting conveyor assembly in a first drive zone, at a first drive speed,
(ii) an accelerating conveyor, for accelerating the speed of travel of units of material along the path of travel of said conveyor system, whereby each unit of material is accelerated into sole occupation of a discrete portion of the length of said conveyor system, and
(iii) an acceleration zone comprising a joint between said removal conveyor and said accelerating conveyor, extending both longitudinally along the length and transversely across said converting conveyor assembly, whereby each unit of material is accelerated into sole occupation of a discrete portion of the length of said conveyor system as the unit traverses said joint.

53. An apparatus as in claim 52, said joint extending across said converting conveyor assembly at an angle of about 0.5 degrees to about 89 degrees, with respect to said longitudinal axis.

54. An apparatus as in claim 52, said joint extending across said converting conveyor assembly at an angle of about 20 degrees to about 80 degrees, with respect to said longitudinal axis.

55. An apparatus as in claim 52, said joint extending across said converting conveyor assembly at an angle of about 30 degrees to about 65 degrees, with respect to said longitudinal axis.

56. An apparatus as in claim 52 and including a controller, for controlling said depalletizing apparatus.

57. An apparatus as in claim 52, wherein said converting conveyor assembly further comprising (iii) an alignment zone for alignment of said units of material, wherein said units of material are converted into a line advancing single file, said alignment taking place after the units of material are accelerated into sole occupation of discrete portions of the length of said conveyor system.

58. An apparatus as in claim 57, wherein said alignment zone includes (iv) a driven shunt apparatus mounted transverse to the path of travel, for urging said units of material which are not aligned with said exit conveyor to move transversely and into a line, advancing single file along said length of said conveyor system, from said alignment zone.

59. An apparatus as in claim 58, wherein said driven shunt apparatus comprises an upright driven conveyor disposed to engage upright sides of the units of material, and thereby to urge the units of material, to form said line, advancing single file along said length of said conveyor system.

60. An apparatus, comprising:
   (a) an unloading station for removing units of material from a supporting surface; and
   (b) a conveyor system, for receiving the units of material from the supporting surface, said conveyor system having a length, and a path of travel, and comprising a converting conveyor assembly, for receiving the units, and for converting a group of the units of material into a line of units advancing single file, said converting conveyor assembly comprising
      (i) a removal conveyor, for receiving the units of material from said unloading station, and for driving the units of material in groups, each such group advancing along said converting conveyor assembly in a first drive zone, at a first drive speed,
      (ii) an accelerating conveyor, for accelerating the speed of travel of units of material along the path of travel of said conveyor system, whereby each unit of material is accelerated into sole occupation of a discrete portion of the length of said conveyor system, said acceleration occurring across the entire width of said path of travel at a second drive speed, said second drive speed being faster than said first drive speed,
      (iii) an alignment zone for alignment of said units of material, wherein said units of material are converted into a line advancing single file, said alignment taking place after the units of material are accelerated into sole occupation of discrete portions of the length of said conveyor system, and wherein said alignment zone includes (iv) a driven shunt apparatus mounted transverse to the path of travel, for urging said units of material which are not aligned with said exit conveyor to move transversely and into a line, advancing single file along said length of said conveyor system, from said alignment zone.

61. An apparatus as in claim 60, said converting conveyor assembly having a longitudinal axis extending along said length, said removal conveyor having a discharge end abutting an entrance end of said accelerating conveyor, said discharge end and said entrance end, of said removal conveyor and said accelerating conveyor respectively, in combination, comprising a joint between said removal conveyor and said accelerating conveyor, said joint extending across said converting conveyor assembly at an angle of about 0.5 degrees to about 89 degrees, with respect to said longitudinal axis.

62. An apparatus as in claim 61, said joint extending across said converting conveyor assembly at an angle of about 20 degrees to about 80 degrees, with respect to said longitudinal axis.

63. An apparatus as in claim 61, said joint extending across said converting conveyor assembly at an angle of about 30 degrees to about 65 degrees, with respect to said longitudinal axis.

64. An apparatus as in claim 60, wherein said driven shunt apparatus comprises an upright driven conveyor disposed to engage upright sides of the units of material, and thereby to urge the units of material, to form said line, advancing single file along said length of said conveyor system.

65. An apparatus as in claim 60 wherein an acceleration zone comprises a joint between said removal conveyor and said accelerating conveyor, extending both longitudinally along the length, and transversely across said converting conveyor assembly, whereby, when a group of units of material traversing said converting conveyor assembly has a first unit of material closest to a first side of said converting conveyor assembly, a last unit of material on a second opposite side of said converting conveyor assembly, and the remainder of the units of material arrayed transversely across said converting conveyor assembly between the first and last units of material, said conveyor system transfers the units of material of the group across said joint, to said accelerating conveyor in a sequence, with respect to the units of the group, taken transversely across said converting conveyor assembly, beginning with the first unit of material and ending with the last unit of material, such that each unit of material gains sole occupation of a discrete portion of said length of said conveyor system, in said acceleration zone.

66. An apparatus as in claim 60 and including a controller, for controlling said apparatus.

67. An apparatus as in claim 60 wherein said second drive speed is uniform across the width of the converting conveyor assembly at said accelerating conveyor.

68. A method of removing a group of units of material from a supporting surface, and converting said group, said method comprising the steps of:
   (a) removing said group from said supporting surface and depositing said group onto a conveyor system, said conveyor system having a length dimension, and comprising a converting conveyor assembly, said converting conveyor assembly having a transverse dimension, and comprising a removal conveyor having a path for advancing said units of material along said length, and an accelerating conveyor, said converting conveyor assembly comprising a receiving zone on said removal conveyor, and an acceleration zone including at least a portion of said accelerating conveyor, said depositing of said group onto said conveyor system comprising depositing said group on said removal conveyor, in said receiving zone;
   (b) advancing said group of units of material along said path of said removal conveyor, in a first drive zone, in a first direction, at a first speed, with said units of material travelling in said group;
   (c) transferring said group into said acceleration zone, and accelerating the rate of advance of each of said units of material along said converting conveyor assembly by transferring each of said units of material in said group to said accelerating conveyor at a time different from the time any other said unit of material is transferred, with each of said units of material, in said acceleration zone, being accelerated in said first direction, from said group, to a second speed faster than said first speed, such that each of said units of material, when so accelerated, advances and gains sole occupation of a discrete portion of said length of said conveyor system, and (d) aligning said units of material into a line advancing single file, said alignment taking place after the units of material are accelerated into sole occupation of discrete portions of the length of said conveyor system.

69. A method as in claim 68 wherein said groups are formed by layers having rows, and including transferring said rows to said accelerating conveyor while the respective said rows, in the respective said layer, are abutted one against the other, and wherein at least one unit of material of a trailing such abutted row is transferred to said accelerating conveyor while at least one unit of material of the next leading row is still on said removal conveyor.

70. A method as in claim 68, each said unit of material having a leading side leading said unit of material as said unit of material begins said advancing along said removal conveyor, and wherein said leading side continues to lead said unit of material until said unit of material gains sole occupation of said discrete portion of said length of said conveyor system.

71. A method as in claim 68 wherein each unit of material so accelerated advances to a position ahead of all of said units of material which have not, to that time, been so accelerated.

72. A method as in claim 68, said group having a first unit of material closest to a first side of said converting conveyor assembly, and a last unit of material closest to a second opposite side of said converting conveyor assembly, with the remainder of said units of material being arrayed across said transverse dimension of said converting conveyor assembly in sequence between said first and said last units of material, said method including accelerating said units of material in a sequence taken transversely across said converting conveyor assembly, in said acceleration zone, beginning with said first unit of material and ending with said last unit of material.

73. A method as in claim 68, said removal conveyor having a discharge end abutting an entrance end of said accelerating conveyor, said discharge end, and said entrance end, of said removal conveyor and said accelerating conveyor respectively, in combination, comprising a joint between said removal conveyor and said accelerating conveyor, extending both longitudinally along and transversely across said converting conveyor assembly, and after said depositing of said group onto said removal conveyor, with said group having a first unit of material closest to a first side of said converting conveyor assembly, a last unit of material closest to a second opposite side of said converting conveyor assembly, and the remainder of the units of material arrayed transversely across said converting conveyor assembly, between said first and last units of material, transferring said units of material across said joint, to said accelerating conveyor in a sequence taken transversely across said converting conveyor assembly, beginning with the first unit of material and ending with the last unit of material, whereby each such unit of material gains sole occupation of the discrete portion of said length of said conveyor system.

74. A method as in claim 68 and including, prior to accelerating the respective said units of material in said group, the step of separating said group from any other group travelling on said converting conveyor assembly.

* * * * *